A. STEWART.
SELECTIVE SPEED TRANSMISSION MECHANISM.
APPLICATION FILED APR. 25, 1919.
1,328,062.
Patented Jan. 13, 1920.
3 SHEETS—SHEET 2.
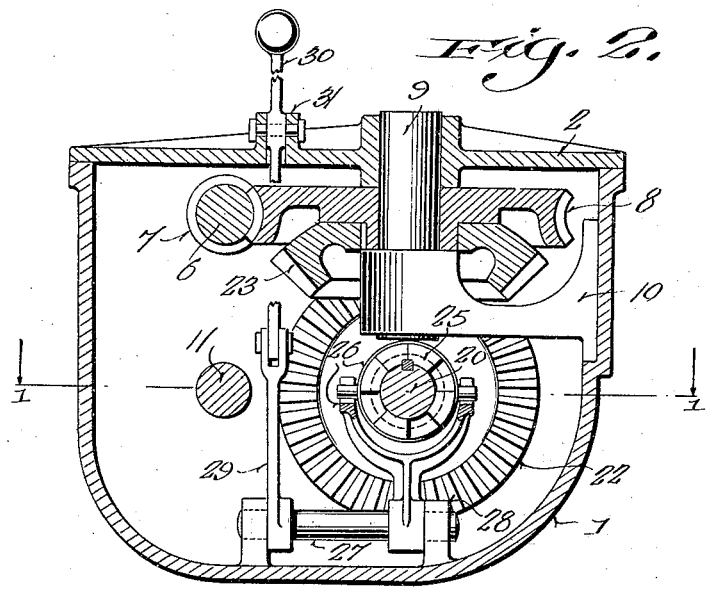
Fig. 2.
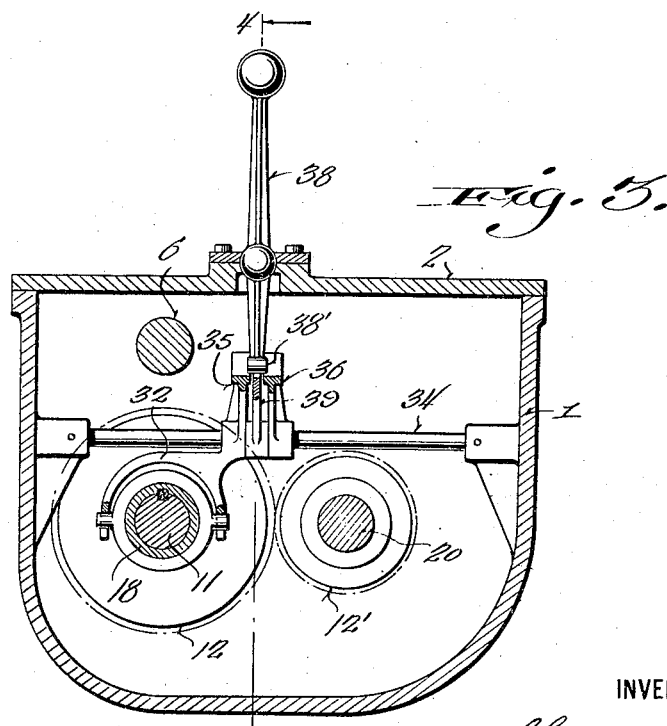
Fig. 3.
WITNESSES:
INVENTOR
Alexander Stewart
BY 
ATTORNEY

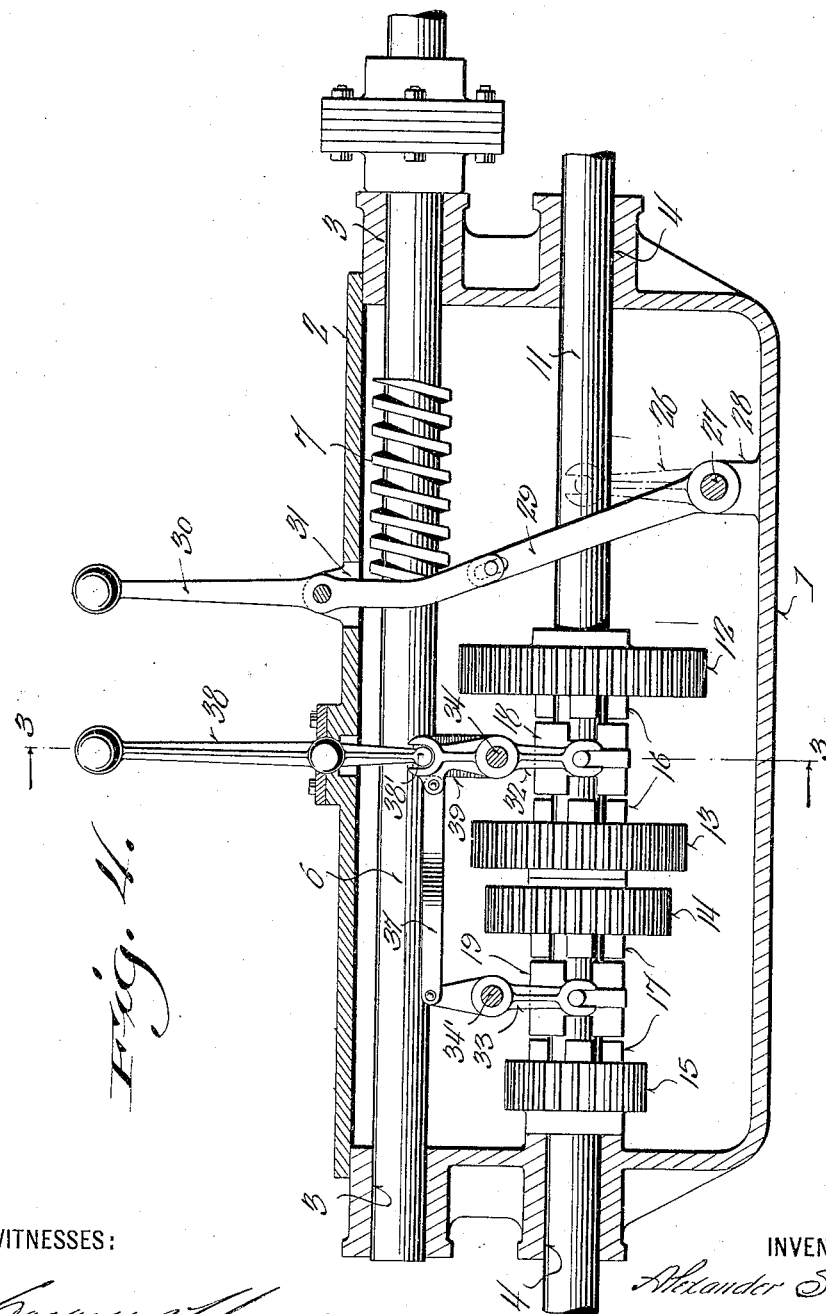

UNITED STATES PATENT OFFICE.

ALEXANDER STEWART, OF CLINTONVILLE, WISCONSIN.

SELECTIVE SPEED-TRANSMISSION MECHANISM.

1,328,062.  Specification of Letters Patent.  Patented Jan. 13, 1920.

Application filed April 25, 1919. Serial No. 292,553.

*To all whom it may concern:*

Be it known that I, ALEXANDER STEWART, a citizen of the United States, and resident of Clintonville, in the county of Waupaca and State of Wisconsin, have invented certain new and useful Improvements in Selective Speed-Transmission Mechanism; and I do hereby declare that the following is a full, clear, and exact description thereof.

My invention relates to new and useful improvements in transmission gearing, and more particularly to selective speed mechanism for use on tractors, automobiles, similar motor vehicles and boats.

It is one of the important objects of this invention to provide a transmission mechanism which will be exceedingly compact in construction, easily manipulated and efficient in operation. I procure compactness in this mechanism by re-arranging the shafts and certain other parts which are commonly used in constructions of this nature, and also by employing a worm gear connection between the primary drive shaft and the counter shaft, or between either of these shafts and the secondary drive shaft.

In a transmission mechanism primarily adapted for tractors, it is essential that the same be provided with means whereby the power from the primary drive shaft may be transmitted to the secondary drive shaft to rotate the latter in either direction and with equal facility, this being necessary since a tractor must be run backward nearly as much as forward. In carrying out this feature of my invention, provision is made for permitting operation of the vehicle or boat, on which the mechanism is mounted, backward with just as many changes of speed as forward.

A further object of the invention is to provide an improved clutch shifting mechanism which will positively prevent accidental operation of the shifting lever when the same is in a neutral position.

With these general objects and advantages in view, the invention resides in the novel features of construction, combination and arrangement of parts which will be hereinafter more particularly described and claimed and shown in the drawings, wherein:—

Fig. 2 is a vertical transverse sectional view on the plane of the line 2—2 of Fig. 1.

Fig. 3 is a similar view taken on the plane of the line 3—3 of Figs. 1 and 4.

Fig. 4 is a vertical longitudinal sectional view on the planes of the line 4—4 of Figs. 1 and 3.

Figure 1:
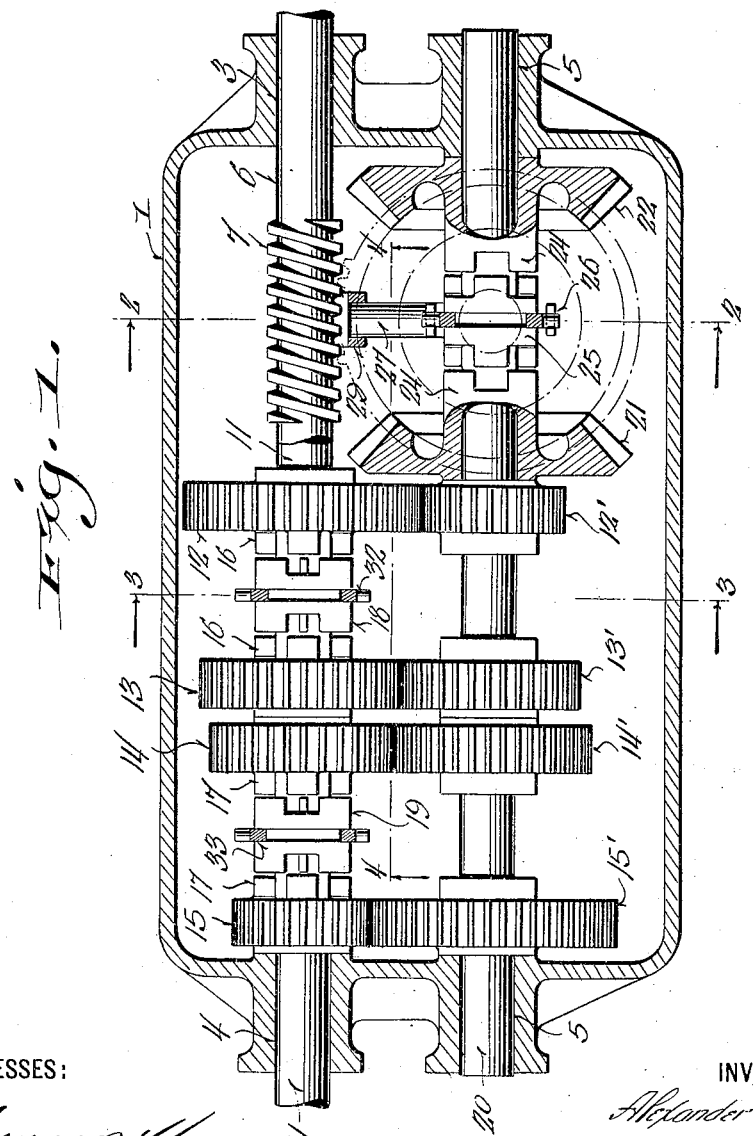
Figure 1 represents a sectional view of my improved transmission mechanism, said section being taken approximately on the plane of the line 1—1 of Fig. 2, the right hand side of this view, however, being taken in a somewhat higher plane passing through the worm shaft 6.

As is customary in mechanisms of this general character regardless of the type of machine on which they are used, the gearing and certain shiftable parts are inclosed in a dust-proof housing, that in the drawings being indicated by the numeral 1. From said drawings it will be seen that I preferably make the casing substantially in the form of a rectangular box of a size sufficient to snugly receive the required amount of shafting, gearing and the like arranged in its most compact form; the box is provided with a removable cover 2 and each end wall has three bearing openings 3, 4 and 5 respectively, the corresponding openings of one end being alined with those of the other end.

A primary drive shaft 6 has one end portion inserted through the housing 1 and journaled in the bearing openings 3, this shaft being connected with a motor, not shown. On this primary drive shaft and within the housing 1 is a worm 7; a worm gear 8 mounted on a vertical stub shaft 9 carried by the cover 2 is continuously enmeshed with the worm 7 as is most clearly shown in Fig. 2. The stub shaft 9 is also supported in a bracket 10 which projects from one wall of the housing, all these parts being located therein.

Disposed parallel to the primary drive shaft 6 and located vertically beneath the same is a secondary drive shaft 11, the ends of which are extended externally of the end walls of the housing, they being journaled in said bearing openings 4, and connected with differential mechanism or other wheel driving means in the case of a four-wheel drive tractor, or with corresponding mechanisms in other machines. As a part of a speed changing mechanism, I loosely mount on the secondary drive shaft 11, a plurality of spur gears 12, 13, 14 and 15 of different sizes. The adjacent faces of the gears 12 and 13, and 14 and 15 are provided with clutch elements 16 and 17, a double faced clutch member 18 being splined on said shaft for coöperation with the clutch elements 16, and a corresponding clutch member 19 being likewise mounted thereon for engagement with the clutch elements 17. The improved means for selectively shifting these clutch members to lock either of the gears to said secondary drive shaft will be hereinafter more particularly set out.

Four spur gears 12', 13', 14' and 15' are splined on a counter-shaft 20 which is journaled in the bearing openings 5 of the housing 1, these gears being continuously in mesh with the gears 12, 13, 14 and 15 respectively whereby any rotation of the counter-shaft 20 will be transmitted to the secondary drive shaft 11 when either of the last mentioned gears is locked to the latter shaft, the difference in speed of rotation between said shafts being dependent upon the particular gear which is fixed to the secondary drive shaft 11.

Also disposed on the counter-shaft 20, but free to rotate thereon, is a pair of spaced bevel gears 21 and 22, the toothed faces of which are toward each other and in continuous engagement with the toothed face of a third bevel gear 23, the latter being fixed to the worm gear 8 for rotation thereby. It will thus be seen that rotation of the primary drive shaft 6 will be transmitted through the worm 7, the worm gear 8 and the bevel gear 23 to both of the bevel gears 21 and 22, the latter being rotated in opposite directions. Thus, if the bevel gear 21 is locked to the counter-shaft 20, the latter will rotate in one direction, whereas if the other bevel gear 22 is locked thereto, said shaft will revolve in the reverse direction.

A conventional means for selectively locking said bevel gears 21 and 22 to the counter-shaft 20 is shown in the drawings and consists of clutch elements 24 on said gears and a double faced clutch member 25 splined on the shaft between the spaced gears 21 and 22. A spanner 26 is connected with the double faced clutch member 25 and is carried by a rock shaft 27 journaled in bearings 28 projecting from the bottom of the housing 1. A crank arm 29 projects from the rock shaft 27 and has its free end linked to the lower end of a reverse shifting lever 30, the latter being pivoted intermediate its ends between ears 31 on the cover 2 of the housing.

The shifting means for the clutch members 18 and 19 also includes a pair of spanners 32 and 33, the former being connected with the member 18 and the latter with the member 19. Disposed above the clutch member 18 is a supporting rod 34 to which the spanner 32 is pivoted and on which is fulcrumed a pair of spaced shifting arms 35 and 36. The spanner 32 is directly connected with the arm 35 and the spanner 33 is joined with the arm 36 by means of a link 37, said spanner 33 being journaled on a second supporting rod 34', this rod being connected with the side walls of the housing as is also the rod 34.

A standard type of clutch shifting lever 38 is mounted in the cover 2 of the housing, this lever being normally positioned upright, its axis being alined with the space between said shifting arms 35 and 36, with which the inner end 38' is adapted to selectively engage. When, however, the lever 38 is in neutral position, this end 38' is held against movement longitudinally of the housing by being located in the notch of a locking plate 39, the same being fixed to said supporting rod 34 between said arms 35 and 36. When the lever 38 is shifted laterally, the end 38' will be out of alinement with the plate 39 and in position to be engaged with either of the arms 35 and 36 so that when said end 38' is now moved longitudinally of the casing in either direction, one of the clutch members 18 or 19 will be engaged with either of the clutch elements 16 or 17. Through this mechanism the rotation of the primary drive shaft will cause the secondary drive shaft to be revolved either in the same or in a reverse direction and at four speeds different from the speed of the first shaft.

Particular attention is directed to the compact association of the two drive shafts, and the counter-shaft and the several gears and clutches. From Figs. 2 and 3 it will be noted that the primary drive shaft 6 and the counter-shaft 20 are positioned in planes extending at right angles through the axis of the secondary drive shaft 11 and that they are parallel thereto and to each other. This arrangement together with the worm and worm gear and bevel gear connection between the primary drive shaft and the counter shaft permits the parts to be positioned close to each other. Ordinarily when spur gears are used to connect the primary shaft with the counter shaft, the secondary shaft is located on the opposite side of the counter-shaft from the position shown in the drawings, thus causing the parts to be considerably spread apart. In its preferred form, the stub shaft 9 is vertical, its axis being in the vertical plane of the longitudinal axis of the counter-shaft 20, the worm gear 8 being thereby disposed horizontally as is also the bevel gear 23.

Various minor changes may be made in the form and proportion and arrangement of the several parts of the invention without departing in any manner from or sacrificing any of the principles thereof.

What is claimed is:

1. In a transmission mechanism, a housing, a primary shaft extended thereinto, a secondary shaft extended through the housing parallel to the primary shaft, a counter shaft in the housing and parallel to the other two shafts, the primary and counter shafts being positioned in planes extending substantially at right angles from the axis of the secondary shaft, a worm and worm gear connection between the primary and counter shafts, and selective speed transmission mechanism between the counter and secondary shafts.

2. In a transmission mechanism, a housing, a primary shaft extended thereinto, a secondary shaft extended through the housing parallel to the primary shaft, a counter shaft in the housing and parallel to the other two shafts, a worm on the primary shaft, a stub shaft in the housing, a worm gear on the stub shaft and meshed with said worm, a driving connection between said worm gear and counter shaft, and a selective speed transmission mechanism between the counter and secondary shafts.

3. In a transmission mechanism, a housing, a primary shaft extended thereinto, a secondary shaft extended through the housing parallel to the primary shaft, a counter shaft in the housing and parallel to the other two shafts, a worm on the primary shaft, a stub shaft in the housing, a worm gear on the stub shaft and meshed with said worm, a bevel gear carried by the worm gear, a second bevel gear on the counter shaft meshed with the first bevel gear, and selective speed transmission mechanism between the counter and secondary shafts.

4. In a transmission mechanism, a housing, a primary shaft extended thereinto, a secondary shaft extended through the housing parallel to the primary shaft, a counter shaft in the housing and parallel to the other two shafts, a worm on the primary shaft, a stub shaft in the housing, a worm gear on the stub shaft and meshed with said worm, a bevel gear carried by the worm gear, a pair of bevel gears loosely mounted on the counter shaft and meshed with the first bevel gear, a clutch member on each of the pair of bevel gears, a coöperative clutch member to selectively lock either gear of said pair of bevel gears to the counter shaft, and selective speed transmission mechanism between the counter and secondary shafts.

5. In a transmission mechanism, a housing, a primary shaft extended thereinto, a secondary shaft extended through the housing parallel to the primary shaft, a counter shaft in the housing and parallel to the other two shafts, the primary and counter shafts being positioned in planes extending substantially at right angles from the axis of the secondary shaft, a stub shaft in the housing, the axis of said stub shaft being at right angles to the axes of the other shafts and in the plane of the axis of the counter shaft, a worm on the primary shaft, a worm gear on the stub shaft and meshed with said worm, a driving connection between said worm gear and counter shaft, and selective speed transmission mechanism between the counter and secondary shafts.

6. In a transmission mechanism, a housing, a secondary shaft extending through the housing, a counter shaft in the housing, a plurality of gears of different sizes fixed on one of said shafts, a like number of gears of different sizes free to rotate on the other shaft and meshed with the first gears, a clutch member on each of said free gears, coöperative clutch members to selectively lock either of said free gears to its shaft, a pair of spaced bevel gears free on the counter shaft, a clutch member on each of said bevel gears, a coöperative clutch member to lock either of said bevel gears to the counter shaft, a third bevel gear meshed with the pair of bevel gears, a primary shaft, and a driving connection between the primary shaft and the third bevel gear.

7. In a transmission mechanism, a housing, a secondary shaft extending through the housing, a counter shaft in the housing, a plurality of gears of different sizes fixed on one of said shafts, a like number of gears of different sizes free to rotate on the other shaft and mesh with the first gears, a clutch member on each of said free gears, coöperative clutch members to selectively lock either of said free gears to its shaft, a pair of spaced bevel gears free on the counter shaft, a clutch member on each of said bevel gears, a coöperative clutch member to lock either of said bevel gears to the counter shaft, a third bevel gear meshed with the pair of bevel gears, a primary shaft, a worm on said primary shaft, a stub shaft in the housing, and a worm gear on said stub shaft and meshed with said worm, said third bevel gear being fixed to said worm gear to rotate therewith.

In testimony that I claim the foregoing I have hereunto set my hand at Milwaukee, in the county of Milwaukee and State of Wisconsin.

ALEXANDER STEWART.